Aug. 9, 1932.  H. H. McKEE  1,870,581

BACON TREATING METHOD

Filed Feb. 27, 1931

Harry H. McKee,
INVENTOR

BY George W. Johns.
ATTORNEY

Witness—
Wm. C. Meiser

Patented Aug. 9, 1932

1,870,581

UNITED STATES PATENT OFFICE

HARRY H. McKEE, OF CHICAGO, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

BACON TREATING METHOD

Application filed February 27, 1931. Serial No. 518,641.

My invention lends itself equally to the production of skinned bacon and to the production of bacon upon which the skin is permitted to remain. As is well known, the conventional bacon of commerce is produced by curing and smoking that portion of the hog carcass known as the belly, two sides of bacon being produced from each hog.

Bacon is marketed either in the slab or sliced. Much of the bacon produced in the packing house is sliced and packed in the packing house, being shipped by the packing house to large quantity consumers or retailers. Sliced bacon is usually produced in condition for immediate use without further trimming by the consumer. Inasmuch as the skin or rind is inedible, by reason of its toughness, it is preferably removed before the bacon is sliced. Slab bacon is ordinarily sold by the packer to the retailer without removing the skin, which is permitted to remain to protect the bacon and minimize the weight losses.

Usually the skinned bellies are skinned before curing in order that use may be made of the skin, but of course the skin may be removed either before or after smoking. In conventional packing house practice, whether or not the skin is removed, a comb hanger or toothed instrument is attached to one end of the product by inserting the nail-like teeth of the hanger entirely through the product, the product then being suspended in smoke by the hanger, as it is necessary that the product be well secured in order to withstand the ordinary handling in processing. Such insertion of the teeth of a comb hanger entirely through one end of the belly results in unsightly holes which causes the grading down and sometimes utter loss of perhaps one pound on each belly.

In ordinary commercial practice large scale retailers of bacon purchase skinned bellies in the slab form from the packer and regularly return and receive credit for the end through which the teeth have been inserted. Such returned product must be disposed of by the packer at a greatly reduced price. Inasmuch as a considerable quantity of bacon is sliced at the packing house or by large scale retailers, this is a considerable item.

My invention avoids such unsightly holes in product and lends itself to skinned or unskinned bellies. In its preferred form my invention, as practiced in connection with skinned bellies, contemplates the removal of all of the skin with the exception of a strip about one inch wide at one end. About half of this strip is separated from the belly at the edge, resulting in a belly having a skin flap affixed to the belly throughout its length along one edge. The teeth of the comb are inserted in the free portion of the skin whereby the slab may be suspended in the smoke house or stored without damage to the product.

Referring now to the drawing.

Figures 1, 2, 3, 4:
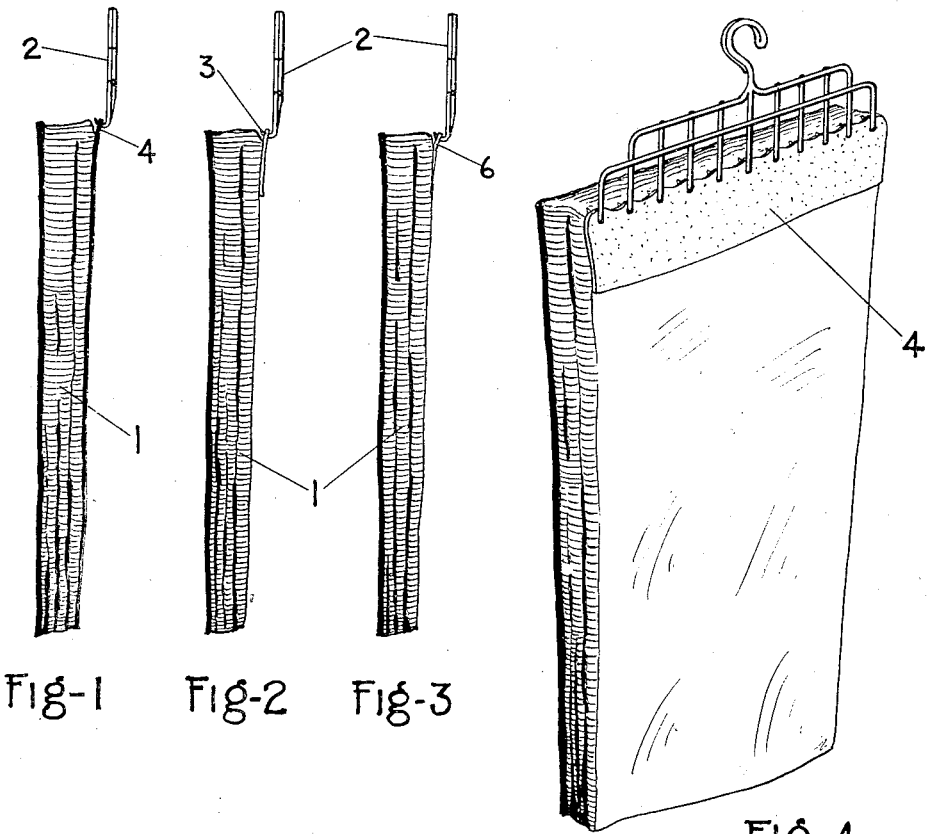
Figure 1 shows a hanger secured to the freed edge of the skin at one end of an unskinned belly.
Figure 2 shows a comb hanger with the teeth inserted into the freed edge of a strip of skin remaining on the skinned belly.
Figure 3 shows the teeth of a comb hanger inserted into a strip of the tough under-fiber or dermis remaining on the end of a skinned belly.
Figure 4 shows the belly of Figure 2 in perspective.
Figure 5:
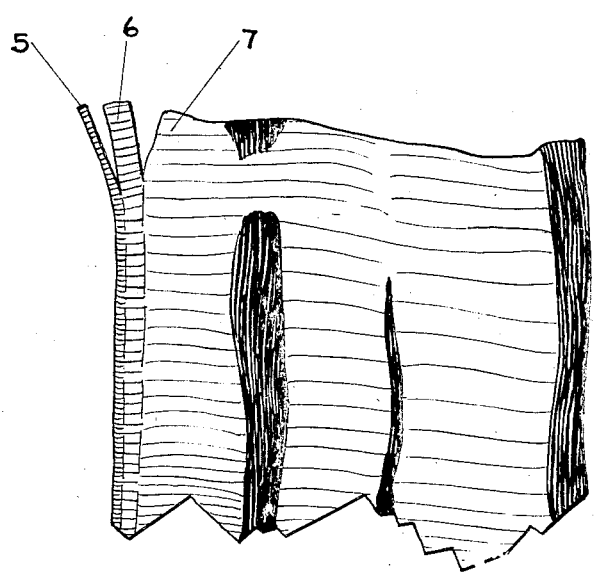
Figure 5 is an enlarged cross-section of one end of the belly.

Similar numerals of reference in the several figures of the drawing accompanying this specification and made a part hereof, refer to identical items in the several figures. The belly 1 is suspended from the comb hanger 2. The comb hanger 2 is provided with a plurality of teeth as 3 adapted to be inserted through the skin 4 at one edge of the bacon. In Figure 5 I have shown diagrammatically a cross-sectional view of one end of a side of bacon. The section is considerably enlarged. It will be noted here that I have shown the skin 4 divided into an epidermis 5 and dermis 6 separated from each other and from the fatty tissue 7. In Figures 1 and 2 the skin 4 is removed for a slight distance from the fatty tissue 7, although it would, of course, be sufficient to remove merely the epidermis for this purpose. In Figure 3, the epidermis has been entirely removed and a small strip of the dermis 6 permitted to remain to afford anchorage for the comb hanger. It will be understood that I am using the term "epidermis" to designate the tough outer rind or skin, and term "dermis" to designate the tissue lying just beneath the epidermis. This tissue which lies just beneath the epidermis is not as tough as the epidermis but the bristles on the hog do pass down into this tissue ordinarily having their roots in this particular layer. This tissue has a considerable quantity of fat cells distributed through it, and from visual inspection does not appear to be very different in color or texture from the fatty tissue beneath. However, insertion of a pointed instrument in the dermis as compared with a like insertion in the fatty tissue immediately indicates a much greater tensile strength in the dermis. Where the skin is separated, any gripping means may be used instead of a conventional comb hanger.

I have found in practice that a strip of skin may be conveniently left upon the belly whether it is skinned by hand or by machine. The labor incident to severing the skin from the belly for a short distance, as shown in Figure 2 and hereinbefore described, is very slight. This strip of skin may, of course, be removed immediately before slicing.

My invention lends itself with equally excellent results to the production of bacon from unskinned bellies, by merely separating the skin from the belly for a distance of about a half inch from the end at the ham end of the belly as shown in Figure 1.

My invention may be practiced without severing the skin, by merely causing the teeth to penetrate the skin without substantially entering the fatty portion of the bacon. I prefer, however, to separate the skin for a short distance, inasmuch as it permits squaring the ham end of the bacon in an appropriate press or mold.

The shoulder end of a side of bacon is normally more nearly square than the ham end. If the bacon is not separated from the skin at the ham end, I find that it does not square up well because the skin is substantially elastic.

Another variation of my invention in the treatment of skinned bellies involves skinning the belly in the usual way but for a short distance from one end, removing only the epidermis, leaving the dermis, or tough tissue, immediately overlaying the soft fat. If a half inch or more of this tough fibery tissue is permitted to remain at the end of the bacon, even though the skin is removed, a sufficient anchorage may be secured to suspend the side of the bacon from appropriate hooks. If all of this tissue is removed with the skin, the bacon cannot be hung by merely inserting the points a short distance into the fat inasmuch as the fatty portion of the bacon is easily torn and will not support the weight of the belly. This method lends itself very well to handling skinned bellies which it is desired to square up for slicing.

It will be understood that changes may be made in the methods of practicing my invention without departing from the spirit thereof in the following claims:

I claim:

1. The method of suspending pork bellies which comprises separating but not severing a portion of the skin from the belly and suspending the belly solely by said separated skin.

2. The method of treating bacon which comprises removing all but a small strip of skin across one end and separating a portion of said strip from said bacon and thereafter suspending said bacon solely by said strip.

3. The method of suspending bacon which comprises inserting a suspension means in a strip of severed skin, which strip of severed skin is integral with a portion of skin adhering to said bacon and suspending the bacon solely by the severed strip of skin.

4. The method of treating bacon which comprises removing all the skin with the exception of the small strip of dermis from which the epidermis has been removed at one end and inserting a suspension means in said strip of dermis, and suspending the bacon solely by the said strip of dermis, said strip of dermis being integral with the bacon.

Signed at Chicago, Illinois, this 25th day of February, A. D. 1931.

HARRY H. McKEE.